United States Patent [19]

Lee et al.

[11] Patent Number: 4,549,761
[45] Date of Patent: Oct. 29, 1985

[54] VEHICLE BODY SEALING ARRANGEMENT

[75] Inventors: David N. Lee, Almont; William M. Tanner, Sterling Heights, both of Mich.

[73] Assignee: General Motors Corporation, Detroit, Mich.

[21] Appl. No.: 626,770

[22] Filed: Jul. 2, 1984

[51] Int. Cl.⁴ .............................................. B62D 27/04
[52] U.S. Cl. ...................................... 296/206; 296/146; 49/490
[58] Field of Search ....................... 296/206, 202, 146; 49/490, 491, 498; 52/716, 717, 718

[56] References Cited

U.S. PATENT DOCUMENTS

| | | | |
|---|---|---|---|
| 2,677,572 | 5/1954 | Pickard | 296/206 |
| 4,348,443 | 9/1982 | Hein | 49/490 |
| 4,496,186 | 1/1985 | Tuchiya et al. | 296/146 |
| 4,497,516 | 2/1985 | Morita et al. | 296/206 |

FOREIGN PATENT DOCUMENTS 161639 9/1983 Japan .

*Primary Examiner*—Robert R. Song
*Attorney, Agent, or Firm*—Herbert Furman

[57] ABSTRACT

A vehicle body sealing arrangement includes a primary weatherstrip having a carrier mounted to a door frame pinchweld and a weatherstrip mounted to the carrier and sealing against the inner wall of the door. A close-out strip includes a base portion releasably mounted to the carrier and a deflectable lip portion which engages the trim panel in the inner wall of the door to conceal the weatherstrip and the portion of the inner panel between the termination of the trim panel and such weatherstrip.

3 Claims, 3 Drawing Figures

VEHICLE BODY SEALING ARRANGEMENT

This invention relates generally to vehicle body sealing arrangements between a vehicle body door and a door frame and more particularly to such a sealing arrangement which includes a primary weatherstrip and a closeout strip which conceals both the primary weatherstrip and the portion of the inner wall of the door between the termination of the door trim and such weatherstrip from view when the door is closed.

It is conventional to seal vehicle body doors to door frames by weatherstrips which include a carrier of generally U-shape configuration mounted to a pinchweld structure of the door frame and carrying a resilient weatherstrip which seals the door frame to the edge portion of the door when the door is closed. It is also conventional to cover the inner walls of vehicle body doors with trim panels. When the door is closed, an opening results between the weatherstrip carrier and the termination of the trim panel. The passenger or driver can look through this opening and see both the weatherstrip and the portion of the inner wall of the door between the termination of the trim and the weatherstrip.

The sealing arrangement of this invention includes both the primary weatherstrip and an additional closeout strip which includes a generally U-shaped configuration base portion and a deflectable lip portion. The base portion of the closeout strip overlies a like-shaped base portion of the weatherstrip carrier and is releasably secured thereto by interengaging fingers or by interengaging fingers and loops. The lip portion extends into deflectable engagement with the trim on the inner wall of the door to thereby close the opening between the weatherstrip carrier and the trim when the door is closed. Thus, both the resilient weatherstrip and the uncovered inner wall of the door are concealed from view by the closeout strip. The deflectable lip portion also acts as a secondary weatherstrip.

The primary feature of this invention is that it provides a vehicle body sealing arrangement for sealing a door frame to a door and including a weatherstrip mounted by a carrier to the door frame and sealing to the door and a closeout strip which is releasably mounted to the carrier and includes a deflectable lip extending into deflectable sealing engagement with the trim on the inner wall of the door to cover both the weatherstrip and the portion of the inner wall of the door between the trim and such weatherstrip.

This and other features will be readily apparent from the following specification and drawings wherein.

Figure 1:
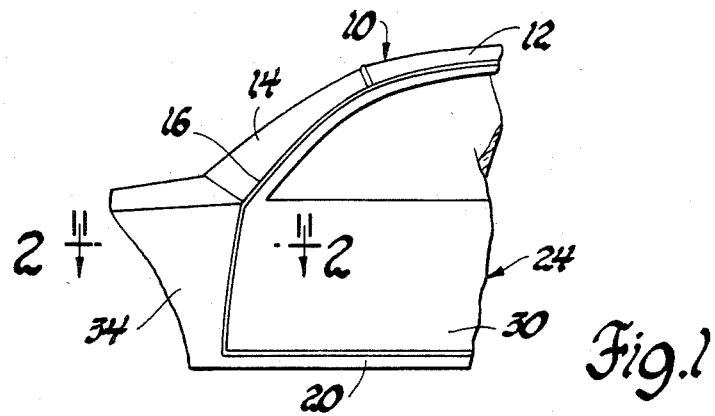
FIG. 1 is a partial elevational view of a vehicle body incorporating a sealing arrangement according to this invention.

Referring now to the drawings, a conventional vehicle body designated generally 10 includes a roof structure 12 having a roof rail structure, not shown, a windshield 14, an A pillar structure 16, a hinge pillar structure 18, and a rocker panel structure 20. The structures 12, 14, 16, 18 and 20 together with a lock pillar or B pillar structure, not shown, provide a door frame having a continuous pinchweld structure 22 for the front door 24 of the body. This door is hinged to the door frame by conventional hinges, not shown, securing the forward wall 26, FIGS. 2 and 3, of the door to the hinge pillar structure 18. In addition to this wall, the door includes an inner wall or door inner panel 28 and a door outer panel 30 which are hem flanged together at 32, FIG. 2. The hinge pillar structure 18 is covered by the vehicle front fender 34. Structure such as described is well known and used in current and past production vehicles manufactured in the United States and elsewhere.

Figure 2:
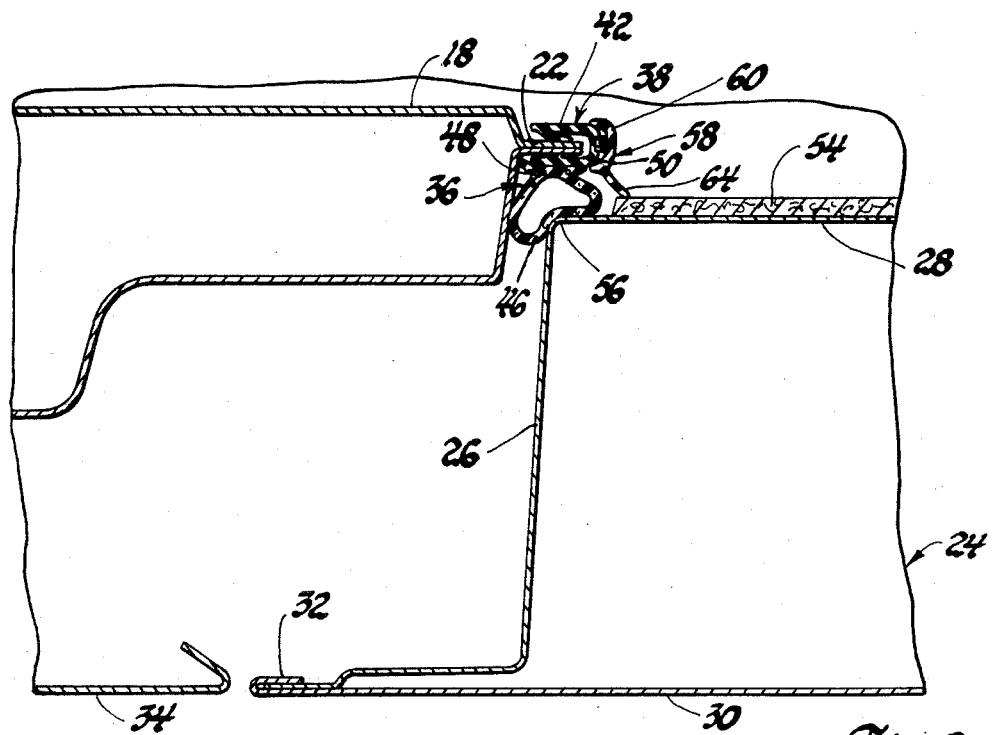
FIG. 2 is an enlarged sectional view taken generally along the plane indicated by line 2—2 of FIG. 1.
Figure 3:
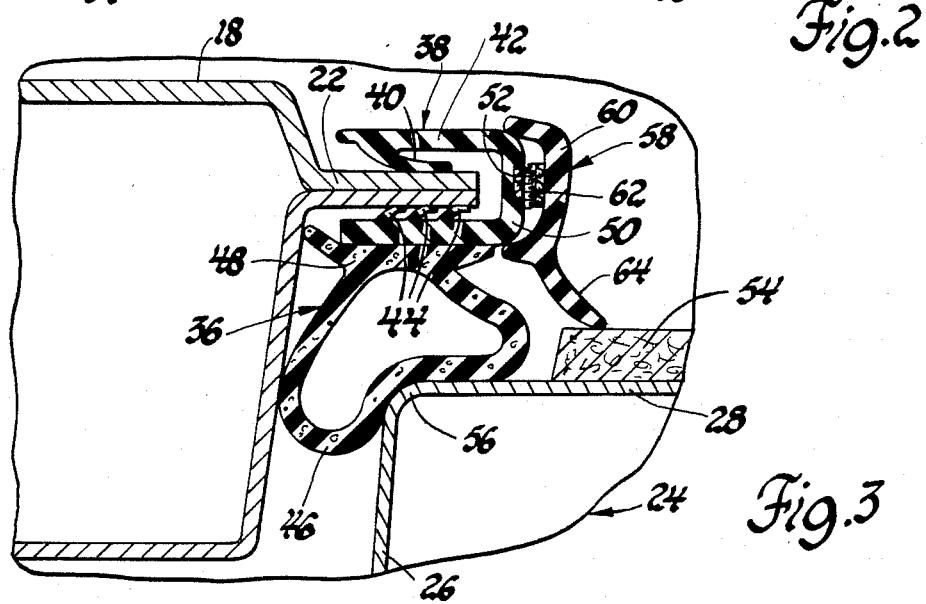
FIG. 3 is an enlarged view of a portion of FIG. 2.

Referring now to FIGS. 2 and 3, a primary weatherstrip structure 36 includes a carrier 38 of extruded rubber or plastic material and of elongated U-shape cross-sectional configuration. The carrier includes a deflectable lip 40 on the inboard leg 42 thereof and a series of deflectable lips 44 on the outboard leg thereof. The lips 40 and 44 grip the pinchweld structure 22 when the carrier 38 is pushed over such structure. It will be understood that the carrier 38 extends entirely around the door frame on the pinchweld structure 22. The carrier 38 is continuous except for one joint at the ends thereof. A primary weatherstrip 46 is of hollow configuration and includes a base 48 which is secured to the outboard leg of the carrier in a conventional manner. The primary weatherstrip is formed of foam material which is softer and more resilient than the material of the carrier. The base portion 50 of the carrier 38 is provided with a series of fingers 52 having hook shaped ends. Such fingers may be formed integral with the base 50 or separately in strip fashion and secured thereto, such as in a recess, as shown.

The inner panel 28 of door 24 is conventionally covered with a trim panel 54 which terminates short of the edge portion 56 of the door between the forward wall 26 and the inner panel 28. When the door is closed as shown in FIGS. 2 and 3, it can be seen that the primary weatherstrip 46 is deflectably engaged with the edge portion 56 and also with a portion of the inner panel 28 adjacent such edge portion. The weatherstrip 46 and the portion of the inner panel 28 between such weatherstrip and the termination of the trim panel 54 are visible to a passenger or driver when seated within the vehicle and looking into the opening between the carrier 38 and the trim panel 54 when the door 24 is closed. In order to conceal the weatherstrip 46 and the unengaged portion of the inner panel 28, a closeout strip 58 is provided. The closeout strip includes a generally U-shaped base portion 60 which is generally configured to the base portion 50 of the carrier 38 and overlies such base portion. A series of hook shaped fingers 62 are provided on the inner wall of base portion 60 for releasable interengagement with the fingers 52 on the base portion of carrier 38. Alternatively, the base portion 60 could be provided with loops to interengage with hooks or fingers on the base portion 50. Extending from the base portion 60 is an integral deflectable lip portion 64 which deflectably engages the trim panel 54 adjacent the termination thereof on the inner panel 28 of door 24.

If the lip portion 64 of the closeout strip 58 were extruded or formed as part of the weatherstrip structure 36, the lip portion would wrinkle or deform at the angular or radiused corners or portions of the door frame. The lip portion 64 cannot therefore follow the angularity of the pinchweld structure because of the relationship of the neutral bending axis of the lip portion 64 to the carrier 38. By forming the closeout strip 58 separate and independent of the weatherstrip structure 36, the lip portion bends around the angular or radiused corners or portions of the door frame on its own neutral bending axis without wrinkling or deforming. Further, the shape of the lip portion 64 with its forward concave and rearward convex surfaces, FIG. 3, aids in avoiding wrinkling or deforming since such surfaces work against each other. Normally the weatherstrip 46 is sufficient to seal the space between the door and the door frame but it will be understood that the lip portion 64, in addition to its concealing function, also has a secondary weatherstrip function.

Thus this invention provides an improved vehicle body sealing arrangement.

The embodiments of the invention in which an exclusive property or privilege is claimed are defined as follows:

1. A vehicle body sealing arrangement for sealing the space between a door frame and the edge portion of a vehicle body door and concealing from view the portion of the inner wall of the door between the termination of the trim on the inner wall and the edge portion of the door comprising, in combination, a weatherstrip carrier mounted on the door frame,
   a primary weatherstrip mounted to the carrier and engageable with the edge portion of the door to seal the door to the door frame,
   a closeout strip including a deflectable lip portion, and
   means mounting the closeout strip to the carrier adjacent to the weatherstrip, the lip portion of the closeout strip extending from the carrier in concealing relationship over the weatherstrip and into deflectable engagement with the trim on the inner wall of the door to conceal both the weatherstrip and the area of the inner wall of the door between the termination of the trim and the weatherstrip.

2. A vehicle body sealing arrangement for sealing the space between a door frame and the edge portion of a vehicle body door and concealing from view the portion of the inner wall of the door between the termination of the trim on the inner wall and the edge portion of the door comprising, in combination, a weatherstrip carrier mounted on the door frame,
   a primary weatherstrip mounted to the carrier and engageable with the edge portion of the door to seal the door to the door frame,
   a closeout strip including a base portion and a lip portion, and
   coacting releasable means on the base portion of the closeout strip and the weatherstrip carrier mounting the closeout strip to the carrier adjacent to the weatherstrip, the lip portion of the closeout strip extending from the carrier in concealing relationship over the weatherstrip and into deflectable engagement with the trim on the inner wall of the door to conceal both the weatherstrip and the area of the inner wall of the door between the termination of the trim and the weatherstrip.

3. A vehicle body sealing arrangement for sealing the space between a door frame and the edge portion of a vehicle body door and concealing from view the portion of the inner wall of the door between the termination of the trim on the inner wall and the edge portion of the door comprising, in combination, a weatherstrip carrier mounted on the door frame,
   a primary weatherstrip mounted to the carrier and engageable with the edge portion of the door to seal the door to the door frame,
   a closeout strip including a base portion and a lip portion, and
   interengaging finger means on the base portion of the closeout strip and the weatherstrip carrier releasably mounting the closeout strip to the carrier adjacent to the weatherstrip, the lip portion of the closeout strip extending from the carrier in concealing relationship to the weatherstrip and into deflectable engagement with the trim on the inner wall of the door to conceal both the weatherstrip and the area of the inner wall of the door between the termination of the trim and the weatherstrip.

* * * * *